US010625487B2

(12) United States Patent
Kerin, Jr. et al.

(10) Patent No.: US 10,625,487 B2
(45) Date of Patent: Apr. 21, 2020

(54) TUBING FOR BRAKE AND FUEL SYSTEMS INCORPORATING GRAPHENE IMPREGNATED POLYAMIDES

(71) Applicant: Martinrea International US Inc., Auburn Hills, MI (US)

(72) Inventors: James J. Kerin, Jr., Brighton, MI (US); Anindya Banerji, Windsor (CA)

(73) Assignee: Martinrea International US Inc., Auburn Hills, MI (US)

( * ) Notice: Subject to any disclaimer, the term of this patent is extended or adjusted under 35 U.S.C. 154(b) by 0 days.

(21) Appl. No.: 16/529,880

(22) Filed: Aug. 2, 2019

(65) Prior Publication Data

US 2020/0041063 A1    Feb. 6, 2020

Related U.S. Application Data

(60) Provisional application No. 62/713,785, filed on Aug. 2, 2018.

(51) Int. Cl.
| | |
|---|---|
| *B32B 1/08* | (2006.01) |
| *F16L 9/02* | (2006.01) |
| *F16L 58/10* | (2006.01) |
| *F16L 9/04* | (2006.01) |
| *F16L 9/133* | (2006.01) |
| *F16L 9/12* | (2006.01) |
| *F16L 9/18* | (2006.01) |
| *F16L 9/147* | (2006.01) |

(52) U.S. Cl.
CPC .............. *B32B 1/08* (2013.01); *F16L 9/02* (2013.01); *F16L 9/04* (2013.01); *F16L 9/12* (2013.01); *F16L 9/121* (2013.01); *F16L 9/123* (2013.01); *F16L 9/133* (2013.01); *F16L 9/147* (2013.01); *F16L 9/18* (2013.01); *F16L 58/1054* (2013.01)

(58) Field of Classification Search
CPC ...... B32B 1/08; F16L 9/02; F16L 9/04; F16L 9/12; F16L 9/121; F16L 9/123; F16L 9/133; F16L 9/147; F16L 9/18
See application file for complete search history.

(56) References Cited

U.S. PATENT DOCUMENTS

| | | |
|---|---|---|
| 5,490,542 A | 2/1996 | Iorio et al. |
| 5,520,223 A | 5/1996 | Iorio et al. |
| 5,590,691 A | 1/1997 | Iorio et al. |
| 5,638,871 A | 6/1997 | Iorio et al. |
| 5,771,940 A | 6/1998 | Iorio et al. |
| 5,867,883 A | 2/1999 | Iorio et al. |
| 5,972,450 A | 10/1999 | Hsich et al. |
| 6,003,562 A | 12/1999 | Iorio et al. |
| 6,041,827 A | 3/2000 | Takahashi et al. |
| 6,245,183 B1 | 6/2001 | Iorio et al. |
| 6,257,281 B1 | 7/2001 | Nie et al. |
| 6,267,148 B1 | 7/2001 | Katayama et al. |
| 6,915,820 B2 | 7/2005 | Picco et al. |
| 8,309,193 B2 | 11/2012 | Emad et al. |

(Continued)

FOREIGN PATENT DOCUMENTS

EP    1053427 B1    11/2003

*Primary Examiner* — Walter Aughenbaugh

(74) *Attorney, Agent, or Firm* — Dinsmore & Shohl LLP

(57) ABSTRACT

A coated metal pipe for use as an automotive fluid transport tube and including any of a single or double walled tubing formed into a circular cross sectional profile. An intermediate primer layer is applied over the tubing. A polyamide incorporating a graphene powder is further applied over the intermediate layer.

20 Claims, 3 Drawing Sheets

(56) References Cited

U.S. PATENT DOCUMENTS

| | | |
|---|---|---|
| 8,439,086 B2 | 5/2013 | Burke, II |
| 9,140,389 B2 | 9/2015 | Moreira De Carvalho et al. |
| 9,556,358 B2 | 1/2017 | Berger et al. |
| 2002/0005223 A1 | 1/2002 | Campagna et al. |
| 2004/0013835 A1 | 1/2004 | Miguel |
| 2018/0045357 A1 | 2/2018 | Kawai et al. |
| 2018/0119871 A1 | 5/2018 | Kawai et al. |

TUBING FOR BRAKE AND FUEL SYSTEMS INCORPORATING GRAPHENE IMPREGNATED POLYAMIDES

CROSS REFERENCE TO RELATED APPLICATIONS

The present application claims the priority of U.S. Ser. No. 62/713,785 filed Aug. 2, 2018.

FIELD OF THE INVENTION

The present invention discloses an automotive fluid transport tube coated with a corrosion, abrasion and impact resistant multi-layer or mono coating system and a related method of manufacturing. The tubes include an outermost coating of a polyamide material incorporating a graphene powder.

DESCRIPTION OF THE BACKGROUND ART

Polyamide coatings are generally known in the art and which exhibit high wear resistant properties along with hydrophobic (water repelling) characteristics. Such coating thicknesses can vary however application thicknesses in the area of 100 micrometers to 1 mm are not uncommon. Such coatings can further include both thermoset and thermoplastic compositions and are often used for finishing and protection of metal surfaces.

The prior art is documented with examples of automotive fluid tubing utilizing such coatings to provide varying performance characteristics. A first example of this is shown by the automotive fluid tubing of Picco et al., U.S. Pat. No. 6,915,820 which is configured for carrying any of gasoline/diesel fuel or hydraulic fluid and is composed of a metal with a coating of aluminum, over which is extrusion coated a polyamide 12 layer and for improving the wear-resistance and corrosion-resistance of the tubing.

A further example of the prior art is depicted in Berger et al., U.S. Pat. No. 9,556,358 which teaches a method for coating of a metallic article, in which the metal surface is coated with a polymer or a two-component system that reacts to form a polymer following application to the metal surface. The composition includes a 70-2700 meq/kg olefinic double bonds which leads to stronger adhesion and to increased corrosion resistance.

US 2018/00453257, to Kawai et al., teaches a multi-layer coated film applied to a metal pipe and which covers an outer circumferential surface of the pipe. The coating film includes a chemical conversion layer containing a zirconium oxide and/or zirconium hydroxide. A primate layer contains a polyamide imide and/or an epoxy resin.

US 2018/0119871, also to Kawai, teaches a coated metal pipe in which the multilayered coating includes a chemical conversation layer and a primer layer which further includes a polyamide imide and at least one kind of additive component selected from a polyamide, a fluorine resin, a silane coupling agent, and an epoxy resin.

SUMMARY OF THE PRESENT INVENTION

The present invention discloses a coated metal pipe for use as an automotive fluid transport tube including any of a single or double walled tubing formed into a circular cross sectional profile. At least one intermediate primer layer is applied over the tubing. A polyamide incorporating a graphene powder is further applied over the intermediate layer.

Additional features include the polyamide layer further including any of a PA 6/12 or PA 12 sacrificial outer layer. The tubing may also include any of a copper plated low carbon steel, low carbon steel, stainless steel, or aluminum.

A nickel plating can be applied to an inner diameter of the tubing. The intermediate diameter may also include a corrosion inhibiting zinc/aluminum alloy. The intermediate layer can further include any of a chrome free conversion coating, primer or primer/adhesive coating, or passivation coating copper coating.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With non-limiting reference to the attached drawings, FIGS. 1-7, the present invention teaches an automotive fluid transport tube of varying compositions, each of which being coated with a corrosion, abrasion and impact resistant multi-layer or mono coating system. The present invention also teaches a related method of manufacturing any tube covered under the present system, article or assembly. In each variant disclosed, the tubes include an outermost coating of a polyamide material incorporating a graphene powder, such providing high wear resistance and superior insulating properties. For purposes of the present invention, the various ranges of coating thickness described subsequently herein are understood to represent preferred but non-limiting embodiments, and it is envisioned that other ranges can be employed unless otherwise indicated.

Figure 1:
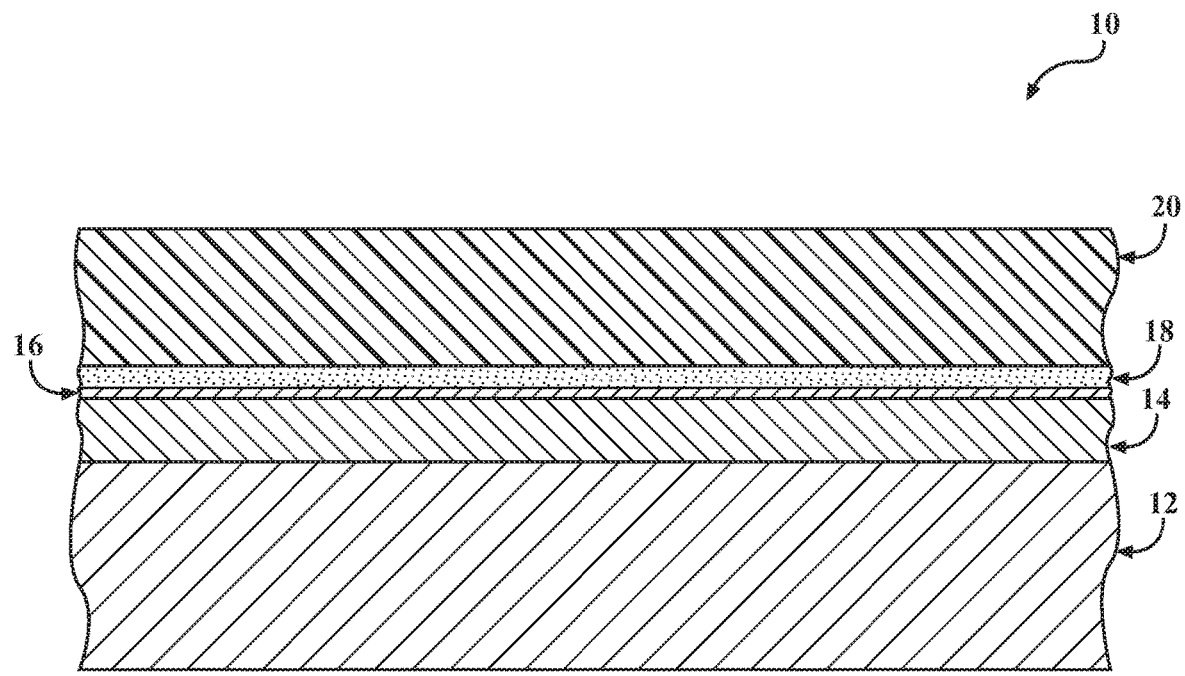
FIG. 1 is a length cutaway illustration of a wall segment of an automotive fluid transport tube according to a first non-limiting embodiment and depicting a first layer of a copper plated low carbon steel roll formed and brazed double wall tubing, a second layer of a hot dipped zinc/aluminum alloy, a third layer of a chrome free conversion coating, a fourth layer of a primer coating and a fifth layer of a polyamide (PA 612 or PA 12) or other polyamide multi or mono wall layer reinforced with a graphene powder extruded onto the primer coating as a top protective layer.

Referring initially to FIG. 1, a length cutaway illustration is generally shown at 10 of a wall segment of an automotive fluid transport tube according to a first non-limiting embodiment. The variant 10 of FIG. 1 includes a plurality of five layers and depicts a first layer 12 of a copper plated low carbon steel roll formed and brazed double wall tubing. The first layer can be further nickel coated on its inner diameter (reference being subsequently made to FIG. 6). A second layer 14 of a hot dipped zinc/aluminum (Galfan) alloy, such as applied at 5-12 micrometer (one millionth of a meter) thickness is applied over the first layer 12.

A third layer 16 of a chrome free conversion coating (such as applied at a non-limiting thickness range of 0.2-0.4 micrometer) is applied over the third layer. A fourth layer 18 of a primer coating (3 micrometer) is applied. Finally, a fifth layer 20 of a polyamide (e.g. including either of a PA 612 or PA 12) or other polyamide multi or mono sacrificial wall layer is applied, such as being reinforced with an extruded graphene powder.

Without limitation, the outer layer 20 can further be reinforced with a two-dimensional allotrope of carbon such as graphene or arrangement of carbon nanotubes. Powdered multilayered graphene, such as which is fabricated by exfoliation techniques, is compounded with the polyamide at any of 1-15 percent by weight loading. In each instance, the end goal is to provide superior properties to the polyamide material produced such that it exhibits improved mechanical properties, enhanced barrier resistance (such as protecting the interior of the tubing of heat/cold temperature extremes as well as establishing hydrophobic properties), as well as increased impact resistance to the steel tubing.

As is known, polyamides are both naturally and artificially and reference a macromolecule with repeating units linked by amine bonds. All polyamides are made by the formation of an amide function to link two molecules of monomer together. Polyamides are easily copolymerized, and thus many mixtures of monomers are possible which can in turn lead to many copolymers. Additionally many nylon polymers are miscible with one another allowing the creation of blends.

Characteristically ides (nylons) are fairly resistant to wear and abrasion, have good mechanical properties even at elevated temperatures, have low permeability to gases and have good chemical resistance. Nylon is a generic designation for a family of synthetic polymers, based on aliphatic or semi-aromatic polyamides.

Polyamide PA 12 polymers are known for performance properties including heir being easy to process in standard extrusion or injection molding equipment, light weight, excellent noise dampening and elimination of vibration, good chemical resistance, low water absorption, outstanding impact properties and flexibility (especially at lower temperatures), enhanced abrasion resistance and resistance to stress cracking.

Related nylon 6/12 (PA) Polyamide 6/12 polymers provide the similar properties of low water absorbing nylon, strength, heat resistance, chemical resistance, wear resistance and lubricity. The numerical nomenclature for nylon is derived from the number of carbon atoms in the diamine and dibasic acid monomers used to manufacture it. The ratio of carbon atoms is what gives each nylon type its unique property characteristics.

Nylon 6/12 was developed as a low moisture absorbing nylon. The low moisture absorption characteristics are derived from its chemical structure; the greater the number of carbon atoms separating the amine groups, the lower the moisture absorbed. With lower moisture absorption, nylon 6/12 does not swell like nylon 6 or nylon 6/6. The reduction in moisture absorption results in a polymer with less ductility than nylon 6 or nylon 6/6. The physical properties and HDT of the polymer are also lower due to reduced crystallinity on the polymer.

Like other nylons, nylon 6/12 is very easily modified to improve wear resistance and physical properties via fiber reinforcement and internal lubricants. Nylon 6/12 compounds are used in a wide range of applications including gears, cams, structural, and electrical components. As such, Nylon 6/12 is an excellent candidate material for applications requiring good physical properties, high heat resistance, moisture and chemical resistance and good dimensional stability.

As is also known, graphene is an atomic scale hexagonal lattice Made of carbon atoms one atom layer in thickness. As is further known, graphene is a one-atom-thick planar sheet of sp2-bonded carbon atoms that are densely packed in a honeycomb crystal lattice. Graphene can be viewed as an atomic-scale chicken wire made of carbon atoms and their bonds. The name comes from GRAPHITE+-ENE, and in which graphite itself consists of many graphene sheets stacked together.

The carbon-carbon bond length in graphene is approximately 0.142 nm. Graphene is the basic structural element of some carbon allotropes including graphite, carbon nanotubes and fullerenes. It can also be considered as an infinitely large aromatic molecule, the limiting case of the family of flat polycyclic aromatic hydrocarbons called graphenes. Measurements have shown that graphene has a breaking strength 200 times greater than steel, making it the strongest material ever tested. Accordingly, and as supported by the present description, an extruded graphene powder combined with polyamide PA 612 or PA 12 materials provides an environmental protective outer or top coat covering which provides superior corrosion, abrasion and impact resistance.

Figure 2:
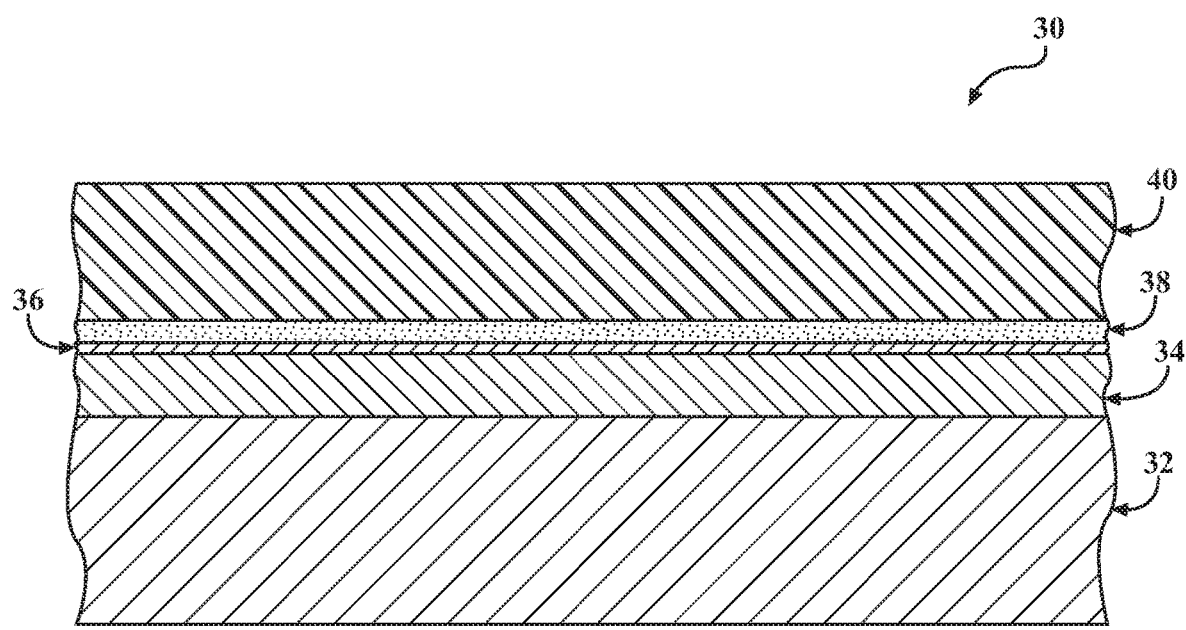
FIG. 2 is a length cutaway illustration of a wall segment of an automotive fluid transport tube according to a second non-limiting embodiment and depicting a first layer of a single wall roll formed tube made of a low carbon steel which can be nickel plated on its inner diameter, a second layer of a zinc/aluminum alloy which is applied over the steel tube by hot dipping, a third layer of a chrome free conversion coating, a fourth primer coating and a fifth layer of a polyamide (PA 612 or PA 12) or other extruded polyamide multi or mono wall layer reinforced with a graphene powder extruded onto the primer coating as a top protective layer.

Referring to FIG. 2, a length cutaway illustration is generally shown at 30 of a wall segment of an automotive fluid transport tube according to a second non-limiting embodiment and depicting a first layer 32 of a single wall roll formed tube made of a low carbon steel which can be nickel plated on its inner diameter (this can include forming by either of double wall brazed or single wall welded construction).

Figure 6:
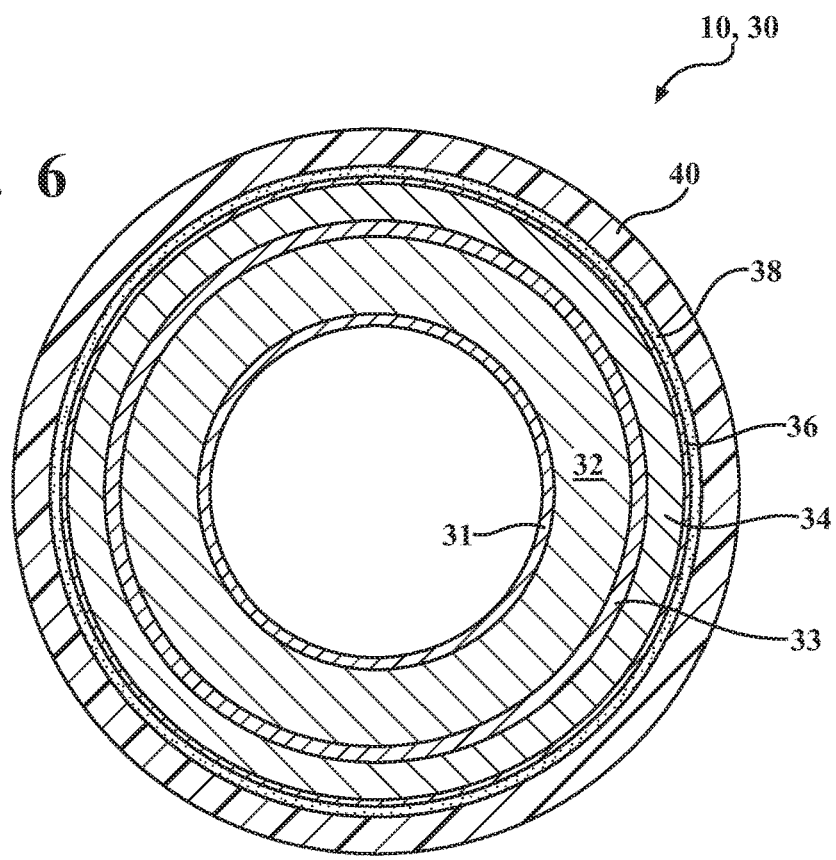
FIG. 6 is an end cutaway illustration of an automotive fluid transport tube based on the variants of FIGS. 1-2.
Figure 7:
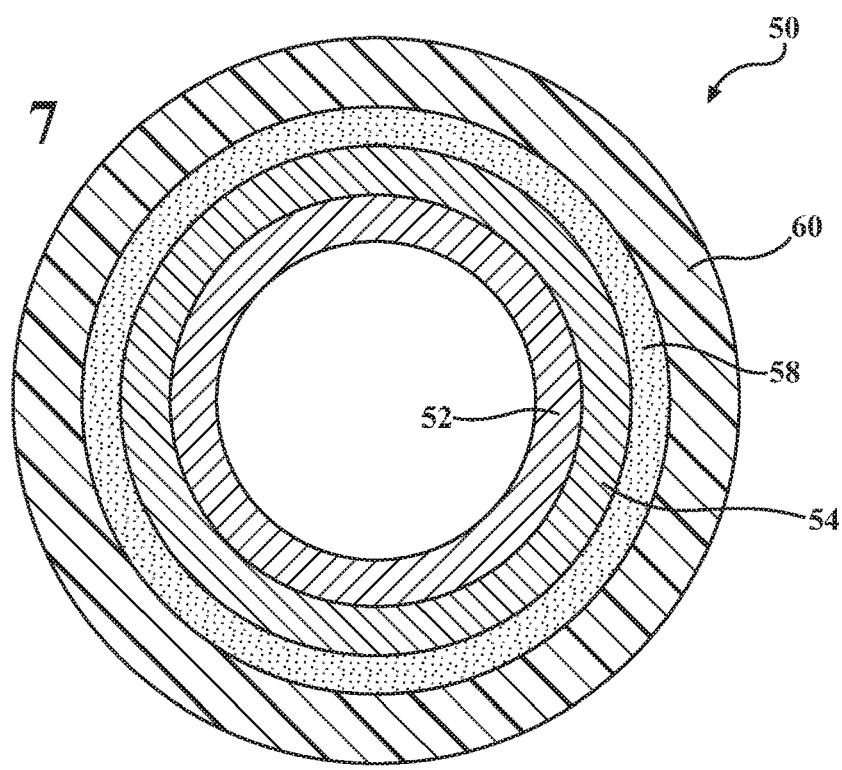
FIG. 7 is an end cutaway illustration of an automotive fluid transport tube based on the variant of FIG. 3.

FIG. 6 is an end cutaway illustration of an automotive fluid transport tube based on the variants 10 and 30 of FIGS. 1-2 and which depicts an electroplated nickel inner diameter 31 (such as four micrometers or greater). A copper coating 33 (such as for brake applications) can include a further three micrometer coating applied over the first layer 32.

A second layer of a sacrificial zinc/aluminum alloy 34 (e.g. Galfan) is applied over the steel tube (and the optional outer coating 33) by hot dipping, such as in order to inhibit corrosion of the tube. A third layer 36 of a chrome free conversion coating is applied over the Galfan coating 34, with a fourth solvent based or primer coating 38 and a fifth layer 40 of a polyamide (PA 612 or PA 12) or other extruded polyamide multi or mono wall layer reinforced with a graphene powder extruded onto the primer coating 38 as a top protective layer.

As with the example of FIG. 1 (at 20), the fifth (outer) layer 40 can further be reinforced with a two-dimensional allotrope of carbon such as graphene or arrangement of carbon nanotubes. Powdered multilayered graphene, such as which is fabricated by exfoliation techniques, is compounded with the polyamide at any of 1-15 percent by weight loading. In each instance, the end goal again is to provide superior properties to the polyamide material produced such that it exhibits improved mechanical properties, enhanced barrier resistance and impact resistance to the steel tubing.

Figure 3:
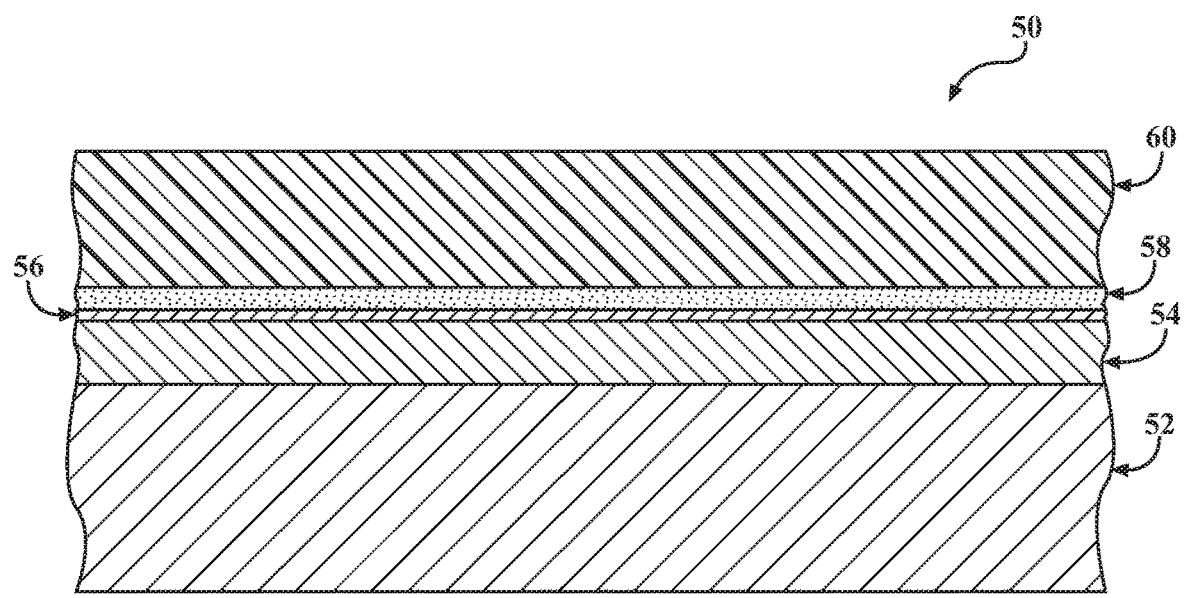
FIG. 3 is a length cutaway illustration of a wall segment of an automotive fluid transport tube according to a third non-limiting embodiment and depicting a first layer of a copper plated low carbon steel roll-formed double wall tubing with contact welding, a second layer of an electroplated zinc applied to the steel tube, a chrome free conversion coating, a fourth layer primer coating and a fifth layer of a polyamide (PA 612 or PA 12) or other extruded polyamide multi or mono wall layer reinforced with a graphene powder extruded onto the primer coating as a top protective layer.

Proceeding to FIG. 3, a length cutaway illustration is generally depicted at 50 of a wall segment of an automotive fluid transport tube according to a third non-limiting embodiment and depicting a first layer 52 of a copper plated low carbon steel roll-formed double wall tubing with contact welding. This is also depicted in the end cutaway illustration of FIG. 7 of an automotive fluid transport tube based on the variant of FIG. 3.

A second layer 54 of an electroplated zinc is applied over the steel tube for inhibiting corrosion. A chrome free conversion coating 56 (FIG. 3) is applied over the electroplated zinc coating layer 54, over which is applied a fourth solvent based primer coating 58 (such as three micrometers in thickness). A fifth layer 60 of a polyamide (PA 612 or PA 12) or other similar extruded polyamide multi or mono wall layer is then applied and which is again reinforced with a graphene powder extruded onto the primer coating as a top protective layer. The fifth layer 60 exhibits similar properties and characteristics to those described at 20 in FIG. 1 and at 40 in FIG. 2, and can be applied according to any thickness, such including without limitation in one example being in a range of not less than fifty to one hundred and fifty micrometers.

Figure 4:
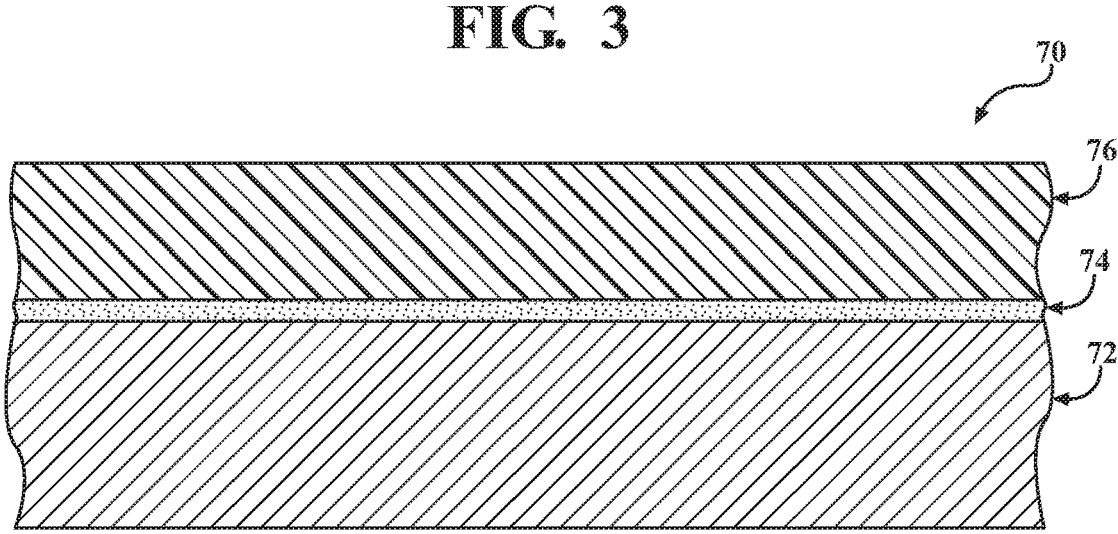
FIG. 4 is a length cutaway illustration of a wall segment of an automotive fluid transport tube according to a fourth non-limiting embodiment and depicting a first layer of a roll formed and welded stainless steel tube made of low carbon steel with double walls, a second solvent based primer coating layer, and a third top coat layer of a polyamide (PA 612 or PA 12) or other extruded polyamide multi or mono wall layer reinforced with a graphene powder extruded onto the primer coating as a top protective layer.

Proceeding to FIG. 4, a length cutaway illustration is generally shown at 70 of a wall segment of an automotive fluid transport tube according to a fourth non-limiting embodiment and depicting a first layer 72 of a roll formed and welded stainless steel tube made of low carbon steel with double walls. A second solvent based primer coating layer 74 (such as three micrometers in thickness in one non-limiting variant) is applied over the base steel tube 72, with a third top coat layer 76 of a polyamide (PA 612 or PA 12) or other extruded polyamide multi or mono wall layer reinforced with a graphene powder extruded onto the primer coating as a top protective layer. As with the layers 20, 40, and 60 in the preceding embodiments, the outer PA 6/12, PA 12 or other polyamide layer with extruded graphene powder provides the coated metal tube with enhanced mechanical properties, (environmental) barrier resistance and impact resistance over prior art coatings.

Figure 5:
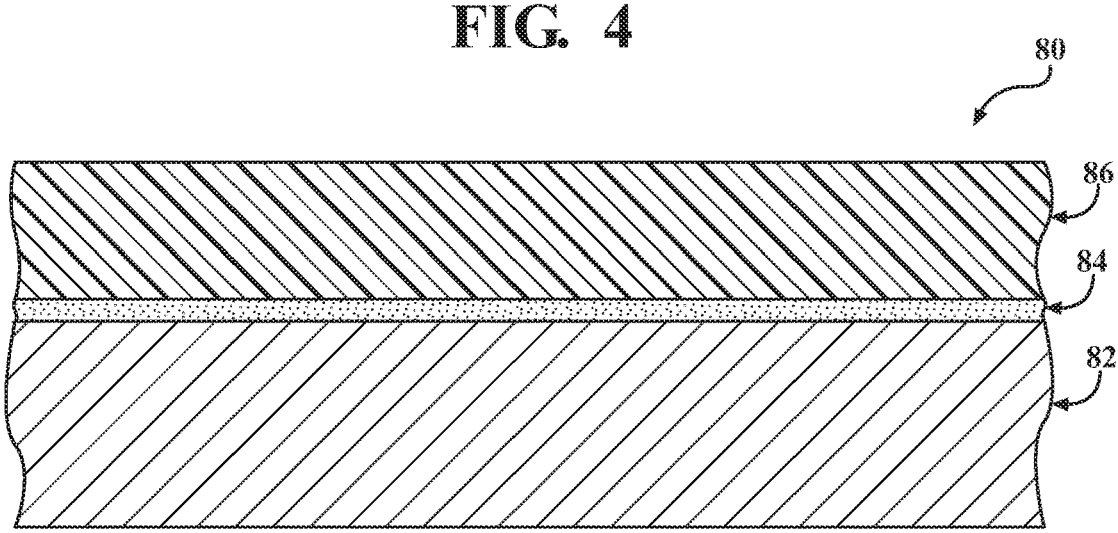
FIG. 5 is a length cutaway illustration of a wall segment of an automotive fluid transport tube according to a fifth non-limiting embodiment and depicting a first layer of an extruded aluminum tube, a second solvent based primer layer, and a third top coat layer of a polyamide (PA 612 or PA 12) or other extruded polyamide multi or mono wall layer reinforced with a graphene powder extruded onto the primer coating as a top protective layer.

Finally, FIG. 5 is a length cutaway illustration, generally at 80, of a wall segment of an automotive fluid transport tube according to a fifth non-limiting embodiment and depicting a first layer 82 of an extruded aluminum tube of a given wall thickness. A second solvent based primer layer 84 (such again being three micrometers in thickness in one non-limiting variant) is applied over the tube layer 82, with a third top coat layer 96 of a polyamide (PA 612 or PA 12) or other extruded polyamide multi or mono wall layer reinforced with a graphene powder extruded onto the primer coating as a top protective layer being applied over the intermediate layer 82.

Having described my invention, other and additional preferred embodiments will become apparent to those skilled in the art to which it pertains, and without deviating from the scope of the appended claims. Among related variants, this can include the use of any suitable forming process not limited to extrusion and including other injection molding techniques for forming the outer polyamide/graphene powder layer about the inner metal tube and desired combination of intermediate corrosion inhibiting layers.

We claim:

1. A coated metal pipe for use as an automotive fluid transport tube, comprising:
   any of a single or double walled tubing formed into a circular cross sectional profile;
   at least one intermediate primer layer applied over said tubing; and
   a polyamide incorporating a graphene powder applied over the intermediate layer.

2. The coated metal pipe of claim 1, said polyamide further comprising any of a PA 6/12 or PA 12 sacrificial outer layer.

3. The coated metal pipe of claim 1, said tubing further comprising any of a copper plated low carbon steel, low carbon steel, stainless steel, or aluminum.

4. The coated metal pipe of claim 3, further comprising a nickel plating applied to an inner diameter of said tubing.

5. The coated metal pipe of claim 1, said intermediate layer further comprising a corrosion inhibiting zinc/aluminum alloy.

6. The coated metal pipe of claim 1, said intermediate layer being selected from a group consisting of a chrome free conversion coating, primer or primer/adhesive coating, or passivation coating copper coating.

7. The coated metal pipe of claim 1, said graphene powder being compounded with said polyamide at 1-15% by weight.

8. A coated metal pipe for use as an automotive fluid transport tube, comprising:
   a copper plated carbon steel tubing formed into a circular cross sectional profile;
   at least one intermediate primer layer including a corrosion inhibiting zinc/aluminum alloy applied over said tubing; and
   an outer polyamide layer applied over said intermediate layer, said outer layer compounded with a graphene powder at 1-15% by weight.

9. The coated metal pipe of claim 1, said polyamide layer further comprising any of a PA 6/12 or PA 12 sacrificial outer layer.

10. The coated metal pipe of claim 8, further comprising a nickel plating applied to an inner diameter of said tubing.

11. The coated metal pipe of claim 8, said intermediate layer being selected from a group consisting of a chrome free conversion coating, primer or primer/adhesive coating, or passivation coating copper coating.

12. A method for manufacturing a coated metal pipe for use as an automotive fluid transport tube, comprising the steps of:
    forming a copper plated carbon steel into a tubing exhibiting a circular cross sectional profile;
    forming at least one intermediate primer layer including a corrosion inhibiting zinc/aluminum alloy applied over the tubing; and
    forming an outer polyamide layer applied over the intermediate layer, the outer layer compounded with a graphene powder at 1-15% by weight.

13. The method as described in claim 12, further comprising the step of applying a nickel plating to an inner diameter of the tubing.

14. The method as described in claim 12, further comprising the step of the intermediate layer being selected from a group consisting of a chrome free conversion coating, primer or primer/adhesive coating, or passivation coating copper coating.

15. The method as described in claim 12, further comprising the step of the polyamide layer selected from a group consisting of a PA 6/12 or PA 12 sacrificial outer layer.

16. The method as described in claim 14, further comprising the step of applying the chrome free conversion coating at a thickness of 0.2-0.4 micrometers.

17. The method as described in claim 14, further comprising the step of applying the primer coating at thickness of 0.3 micrometers.

18. The method as described in claim 12, further comprising the step of forming the outer polyimide layer at thickness not less than fifty micrometers.

19. The method as described in claim 12, the step of forming the copper plated carbon steel tubing further including forming by either of a double wall brazed or singe wall welded construction.

20. The method as described in claim 12, the step of forming at least one intermediate primer layer including a corrosion inhibiting zinc/aluminum alloy applied over the tubing further including applying a hot dip Galfan coating of 95% zinc and 5% aluminum by weight.

* * * * *